(12) United States Patent
Galehr et al.

(10) Patent No.: US 7,918,483 B2
(45) Date of Patent: Apr. 5, 2011

(54) ADJUSTABLE STEERING COLUMN FOR A MOTOR VEHICLE

(75) Inventors: Robert Galehr, Mauren (LI); Michael Scholten, Goetzis (AT)

(73) Assignee: ThyssenKrupp Presta AG, Eschen (LI)

( * ) Notice: Subject to any disclaimer, the term of this patent is extended or adjusted under 35 U.S.C. 154(b) by 32 days.

(21) Appl. No.: 11/996,150

(22) PCT Filed: Jul. 19, 2006

(86) PCT No.: PCT/EP2006/007086
§ 371 (c)(1),
(2), (4) Date: Jul. 8, 2008

(87) PCT Pub. No.: WO2007/009760
PCT Pub. Date: Jan. 25, 2007

(65) Prior Publication Data
US 2008/0290641 A1  Nov. 27, 2008

(30) Foreign Application Priority Data
Jul. 22, 2005  (DE) .......................... 10 2005 034 952

(51) Int. Cl.
*B62D 1/18* (2006.01)
(52) U.S. Cl. ......................................... 280/775; 74/493
(58) Field of Classification Search .................. 74/493; 280/775
See application file for complete search history.

(56) References Cited

U.S. PATENT DOCUMENTS

| | | | |
|---|---|---|---|
| 3,877,670 A * | 4/1975 | Findley et al. | 248/298.1 |
| 4,240,305 A | 12/1980 | Denaldi et al. | |
| 4,449,419 A | 5/1984 | Soler Bruguera | |
| 5,009,121 A | 4/1991 | Matsumoto et al. | |
| 5,131,287 A | 7/1992 | Stromberg | |
| 5,213,003 A | 5/1993 | Speich | |
| 5,269,562 A | 12/1993 | Peitsmeier et al. | |
| 5,377,555 A | 1/1995 | Hancock | |
| 5,678,454 A | 10/1997 | Cartwright et al. | |
| 5,722,299 A | 3/1998 | Yamamoto et al. | |
| 5,788,277 A | 8/1998 | Hibino et al. | |

(Continued)

FOREIGN PATENT DOCUMENTS

DE  33 08 788 A1  9/1983

(Continued)

OTHER PUBLICATIONS

International Search Report dated Oct. 2, 2006 with English translation of relevant portion (six (6) pages).

(Continued)

*Primary Examiner* — Paul N Dickson
*Assistant Examiner* — Joseph Rocca
(74) *Attorney, Agent, or Firm* — Crowell & Moring LLP (57) ABSTRACT

An adjustable steering column for a motor vehicle includes a steering shaft that is mounted in such a manner as to be able to rotate about its axis in an adjusting part, a holding clamp attached to the vehicle for holding the steering column, a holding part, and a fixing device that is opened and closed to allow the adjustment or fixing of the position of steering shaft. The holding clamp includes side cheeks which can be drawn together by closing the fixing device and as a consequence the holding part can be clamped. The holding clamp is formed as a once-piece component and the holding part is swivel mounted on a swivel pin in the holding clamp.

15 Claims, 5 Drawing Sheets

U.S. PATENT DOCUMENTS

| | | |
|---|---|---|
| 5,915,726 A | 6/1999 | Hibino et al. |
| 5,988,010 A | 11/1999 | Olgren |
| 6,036,228 A | 3/2000 | Olgren et al. |
| 6,139,057 A | 10/2000 | Olgren et al. |
| 6,357,318 B1 * | 3/2002 | Koellisch et al. ............. 74/493 |
| 6,357,794 B1 * | 3/2002 | DuRocher ................. 280/777 |
| 6,467,807 B2 | 10/2002 | Ikeda et al. |
| 6,623,036 B2 | 9/2003 | Yamamura et al. |
| 6,666,478 B2 | 12/2003 | Livengood |
| 6,799,779 B2 | 10/2004 | Shibayama |
| 7,401,813 B2 * | 7/2008 | Sawada et al. ............. 280/775 |
| 2002/0026848 A1 | 3/2002 | Kurita |
| 2003/0015056 A1 | 1/2003 | Kromer et al. |
| 2003/0025315 A1 * | 2/2003 | Matsumiya ............... 280/775 |
| 2003/0226943 A1 | 12/2003 | Laisement et al. |
| 2005/0104353 A1 * | 5/2005 | Ikeda et al. ............... 280/775 |
| 2005/0236825 A1 | 10/2005 | Sawada et al. |
| 2006/0214410 A1 | 9/2006 | Sawada et al. |

FOREIGN PATENT DOCUMENTS

| | | |
|---|---|---|
| DE | 41 03 548 C1 | 4/1992 |
| DE | 694 02 891 T2 | 10/1997 |
| EP | 1 468 895 A1 | 10/2004 |
| FR | 2 714 647 A1 | 7/1995 |
| FR | 2 778 704 A1 | 11/1999 |
| GB | 2 116 496 A | 9/1983 |
| GB | 2 297 607 A | 8/1996 |
| WO | WO 2004/086225 A1 | 10/2004 |

OTHER PUBLICATIONS

German Office Action including English translation dated May 5, 2006 (five (5) pages).

* cited by examiner

ADJUSTABLE STEERING COLUMN FOR A MOTOR VEHICLE

The invention relates to an adjustable steering column for a motor vehicle, comprising a steering shaft which is rotatably mounted in an adjusting part, a holding part and a fixing device and when the fixing device is in the open state the adjusting part can be adjusted with respect to the holding part at least in the axial direction of the steering shaft to adjust the position of the steering column and when the fixing device is in the closed state the adjusting part is fixed with respect to the holding part by the fixing device.

Adjustable steering columns are used to increase the comfort of the driver and can be varied in their length, height and/or angular position in order to be able to adjust the position of the steering wheel in relation to the seating position of the driver. For this purpose these steering columns have at their disposal an adjusting part, the position of which can be varied with respect to a holding part and can be fixed using a fixing device or a clamping system.

The problem for adjustable steering columns is that the fixing device ought to be easy to move and it ought to be possible to open and close said fixing device with short travel distances of the actuating members, the fixing device ought to require only a small amount of installation space and simultaneously ought to produce the greatest possible resistances to an unintentional adjustment of the adjusting part with respect to the holding part. Especially in the event of a crash sufficient retention force ought to be provided to open the airbag and/or the energy during the impact of the driver on the steering wheel ought to be reduced in a controlled manner. This reduction in energy can occur either in the clamping system itself or in separate devices which are then disposed conventionally in an operative manner between the holding part and the bodywork.

GB 2297607 A proposes a fixing device where two side cheeks are formed on the left and the right on the holding part, between which cheeks the adjusting part is clamped. An adjustment of a clamping spindle causes the side cheeks for closing the fixing device to press together, so that a corresponding holding force is applied.

The disadvantage of this arrangement resides in the overall relatively low level of holding forces and the required enlargement of the left and right side surfaces on the adjusting part, which is achieved moreover by virtue of an additional sheet metal bending part which is welded to the adjusting part.

The number of individual parts and processing steps is accordingly high. The support of the adjusting part to prevent rotation about the clamping spindle is not very rigid.

DE 3308788 A1 discloses a fixing device for the peripheral tube of a vehicle steering column, consisting of a U-shaped support having two downwardly directed limbs, a flexible sleeve, which comprises axial slots and partially surrounds the peripheral tube, and a U-shaped clamping piece consisting of metal sheet between the sleeve and the limbs of the support. The peripheral tube—the adjusting part—of the steering column can be adjusted with respect to the U-shaped support—the holding part—in its longitudinal and angular position. The fixing device can be opened and closed by means of a clamping tool and thus the position of the adjusting part can be changed or fixed with respect to the holding part.

A disadvantage of the solution presented in this prior art is the small amount of rigidity of the entire structure. In addition, in order to achieve sufficiently high levels of holding forces extremely high actuating forces and/or actuating travel distances must be exerted on the handle or adjusting level to open and close the fixing device.

The object of the invention is to provide a fixing device for a steering column which is adjustable at least in length, i.e. in the axial direction of the steering shaft, which fixing device when in the closed state applies at least in this axial direction high levels of holding forces to prevent the adjusting part being adjusted with respect to the holding part, wherein the actuating travel distances and the actuating forces on the adjusting lever correspond to the comfort requirements of the driver.

The object of the invention is achieved by a steering column according to the features of Claim 1. Advantageous and expedient embodiments of the invention are subject of the subordinate claims.

In accordance with the invention a steering column of the type mentioned in the introduction is proposed for this purpose, in which the surface, directed away from the steering shaft, of the adjusting part comprises in the peripheral direction a plurality of first surface portions, the surface, directed towards the steering shaft, of the holding part which at least partially surrounds the adjusting part, comprises second surface portions, wherein the first and second surface portions extend in the direction of the axis of the steering shaft and wherein for fixing the adjusting part at least three pairs of first and second surface portions can be brought at least partially into non-positive contact or non-positive and positive contact. By virtue of this contact the adjusting part is secured with the holding part in a positive manner to prevent displacement in the direction of the axis of the steering shaft. Even with low levels of perpendicular forces or surface pressing forces, the contact creates a high degree of rigidity in the arrangement and a high level of holding forces to prevent displacement of the adjusting part with respect to the holding part. In the event that the fixing device is open, the surfaces act as guides, so that the adjusting part can be adjusted easily with respect to the holding part by the driver.

Since the holding part is mounted in the holding clamp in such a manner as to be able to rotate about a pivot axis, the steering column can be pivoted in the angular position. For this purpose, oblong holes are provided at a spaced disposition from the pivot axis, the holes being provided in side cheeks of the holding clamp and penetrated by the fixing device which comprises for example a tensioning pin. The oblong holes can both extend in a straight line and also comprise a curved circular portion shape whose centre point lies on the pivot axis.

Preferably, the pivot axis is disposed on one end and the oblong holes and the fixing device are disposed on the other end of the holding clamp (as seen in the longitudinal direction of the steering shaft). As a consequence, in the case of a specific fixing force of the fixing device particularly high forces can be supported on the end, facing the steering wheel, of the steering shaft.

The holding part comprises an orifice along its longitudinal axis which can be reduced in size by closing the fixing device, so that the first and second surface portions on the adjusting part or holding part can be brought into contact with each other by means of a surface pressing force which is necessary to fix the adjusting part, wherein in each case at least one of the surface portions brought into contact is almost planar in design.

The approach to achieve the object in accordance with the invention is intended to produce the highest possible frictional forces by means of in each case two surface contacts as large as possible on the periphery of the adjusting part which friction forces produce high displacement forces when the fixing device is in the closed state and simultaneously to ensure a guide when the fixing device is in the open state. In addition, it ought to be possible to provide a support in as many spatial directions as possible to increase the rigidity and to reduce the tendency to vibrate. The displacement forces and the holding forces can be adjusted by the design of the surface pairs and corresponding surface pressing forces. Therefore, planar surfaces are preferred.

Such an adjusting part and such a holding part can be produced for example in a convenient manner by means of a sheet metal bending and stamping operation and in so doing the surface portions are designed in an almost planar manner. Since during the bending and stamping operations the material experiences only a little expansion, there are limitations owing to the manufacturing process in the precision of the planarity of the surfaces formed in this manner. As tests have shown, this level of accuracy is sufficient to achieve sufficiently high resistance forces preventing the adjusting part being displaced with respect to the holding part.

The manufacture of precise planar surfaces, however, also places high demands on the manufacturing process even in the case of other manufacturing procedures. As a consequence, if the surfaces are formed in an excessively inaccurate manner, the adjusting part can tilt and become jammed with respect to the holding part.

To reduce the demands on accuracy in the procedure for manufacturing the individual surface portions it is provided in a development of the invention that at least one of the first and/or second surface portions comprises at least one strip-like elevation to form discrete pressure points. In this case, the force is transmitted via the contact which forms between the strip-like elevation and the opposite-lying surface portion. As a consequence, the demands placed on the manufacturing accuracy are reduced. Small accuracies in the fit can thus be compensated by means of elastic resiliency in the surface portions. To provide a secure guide and prevent tilting it is preferred that at least one strip-like elevation is aligned in the direction of the axis of the steering shaft. To increase the rigidity at least one strip-like elevation is preferably provided on another surface portion and aligned perpendicular to the axis of the steering shaft. In addition, two such elevations are preferably disposed one behind the other in the adjusting direction.

As an alternative to or also in combination with the use of strip-like elevations, the surface contacts in an advantageous development of the invention are also increased by a slight crowning of the almost planar surfaces, so that as the fixing device is closed firstly the part regions, protruding convexly out of the surfaces, of the first and/or second surface portions come into contact and during the closing process whilst being elastically deformed an extensive surface contact is formed. In so doing, the intrinsic tensions are favourably increased, so that the rigidity of the steering column is still further increased. Convexities, i.e. super-elevations in the surface middle with respect to the edge of the almost planar surface, of up to 0.05 mm have proved themselves to be expedient and useful. When the convexities are too high, the extensive contact can no longer be achieved by means of simple elastic deformation, so that the rigidity of the arrangement is then reduced.

The invention will be explained hereinunder with reference to the schematic figures, in which.

For improved clarity, parts of the steering shaft and the attachment to the vehicle are omitted from all the figures, as they are not essential for the invention.

The steering shaft 2 is mounted in the adjusting part 4 in such a manner as to be able to rotate about the axis 11 and is actuated by the driver using the steering wheel, not illustrated. The adjusting part 4 is guided in an axially displaceable manner in the holding part 3. The holding part 3 is mounted in the holding clamp 5 in such a manner as to be able to rotate about the pivot axis 21. The fixing device 6 formed here as a clamping system and comprising an adjusting lever 10, a tensioning pin 9 and a counter holder 20, a connecting link disc 19 and a cam 18 fixes or releases the movement of the holding clamp 5, the holding part 3 and the adjusting part 4 with respect to each other. By rotating the adjusting lever 10, the cam 18 is displaced in the connecting link disc 19, so that the tensioning pin 9 is displaced. The holding clamp 5 is attached to the vehicle by elements not illustrated here.

Figure 3:
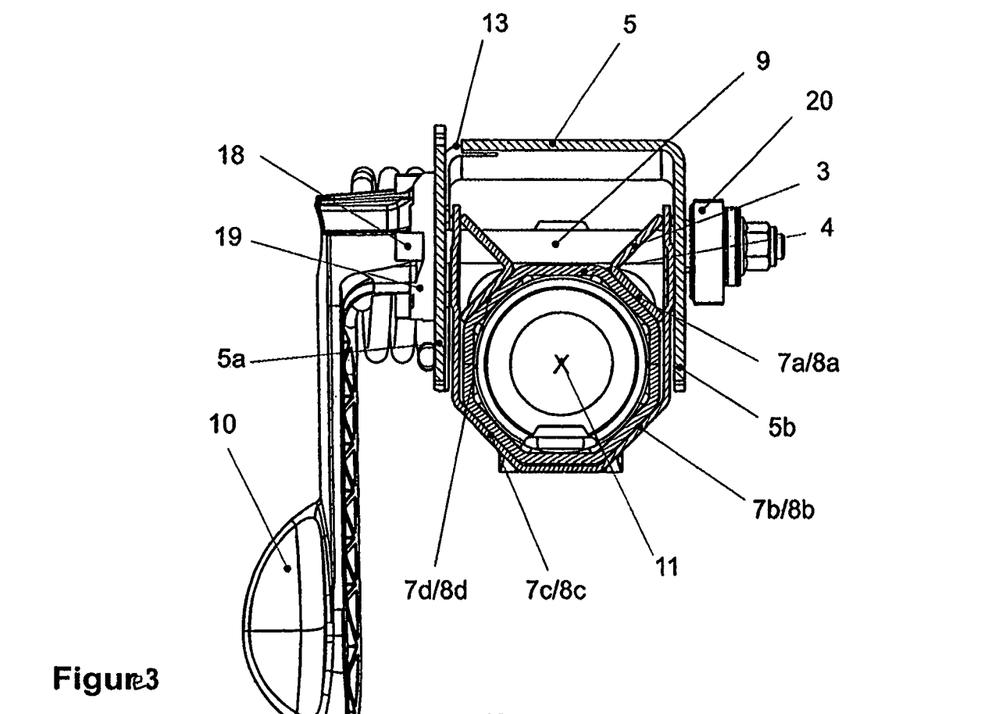
FIG. 3 shows a cross-sectional view through the fixing device in the open state.

In the case that the clamping system 6 is open (cf. FIG. 3) the loading is removed from the side cheeks 5a and 5b of the holding clamp 5, so that although the first and second surface portions are still in contact, this is only with a small level of surface pressing force, so that the adjusting part 4 can be easily displaced with respect to the holding part 3. Simultaneously, the steering column illustrated here can also be pivoted in the angular position. Oblong holes 16 and 17 are provided in the side cheeks 5a and 5b for this purpose.

Figure 4:
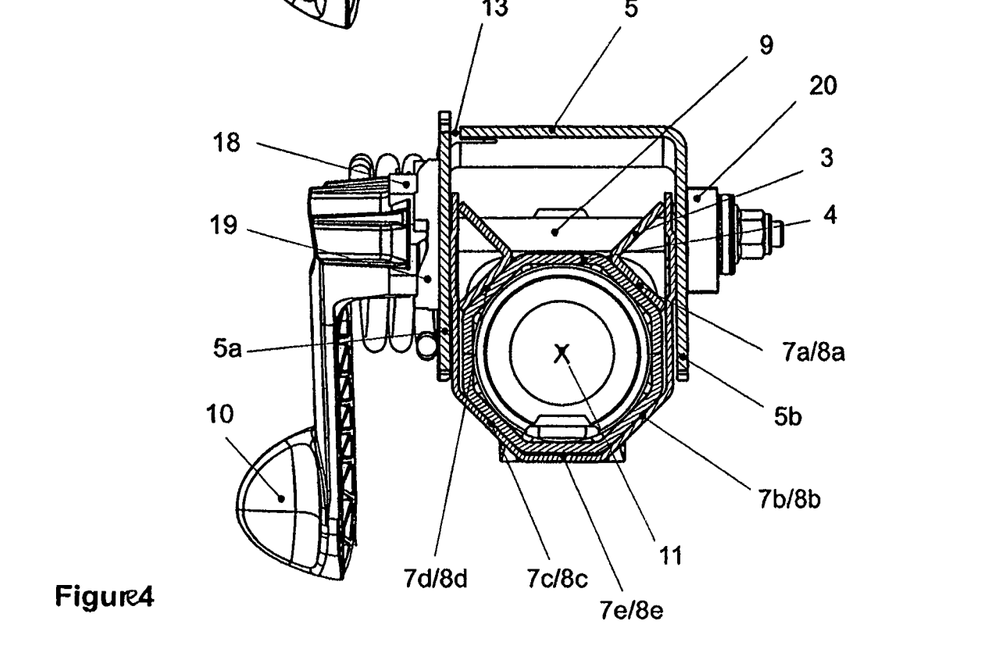
FIG. 4 shows a cross-sectional view through the fixing device in the closed state.

In the case that the clamping system 6 is closed (cf. FIG. 4) the side cheeks 5a and 5b are drawn together and clamp the holding part 3 with the side surfaces 3a and 3b firmly. Simultaneously, the holding part is pressed together, so that four pairs of first surface portions 7a, 7b, 7c, 7d of the holding part 3 and second surface portions 8a, 8b, 8c, 8d of the adjusting part 2 are pressed together.

As an alternative, the holding part 3 and the adjusting part 4 are designed so that only three pairs of first surface portions 7a, 7d, 7e of the holding part 3 and second surface portions 8a, 8d, 8e of the adjusting part 2 are pressed together.

With the solution illustrated, when the fixing device is in the open state, the displacement force can be set without any problem to 1/15 of the value of the displacement force when the fixing device is in the closed state and simultaneously a disturbing feeling of uncertainly which arises owing to excessive play can be avoided.

A slot 13 is provided so that the side cheeks 5a, 5b of the holding clamp 5 can be pressed together more easily.

In the preferred embodiment, the holding part 3 is manufactured as a sheet metal part which is bent and stamped, if necessary by corresponding embossing operations. In the illustrated embodiment the surface portions 8a and 8d are formed on two separate components which are penetrated like the side cheeks 3a and 3b by the tensioning pin 9. The holding part 3 does not surround the adjusting part 4 completely and comprises on its upper side an orifice which extends along its longitudinal axis 12. Preferably the longitudinal axis 12 of the holding part 3 coincides with the axis 11 of the steering shaft 2.

Likewise, the adjusting part 4 and the holding clamp 5 are preferably manufactured using sheet metal bending and stamping technology.

Figure 1:
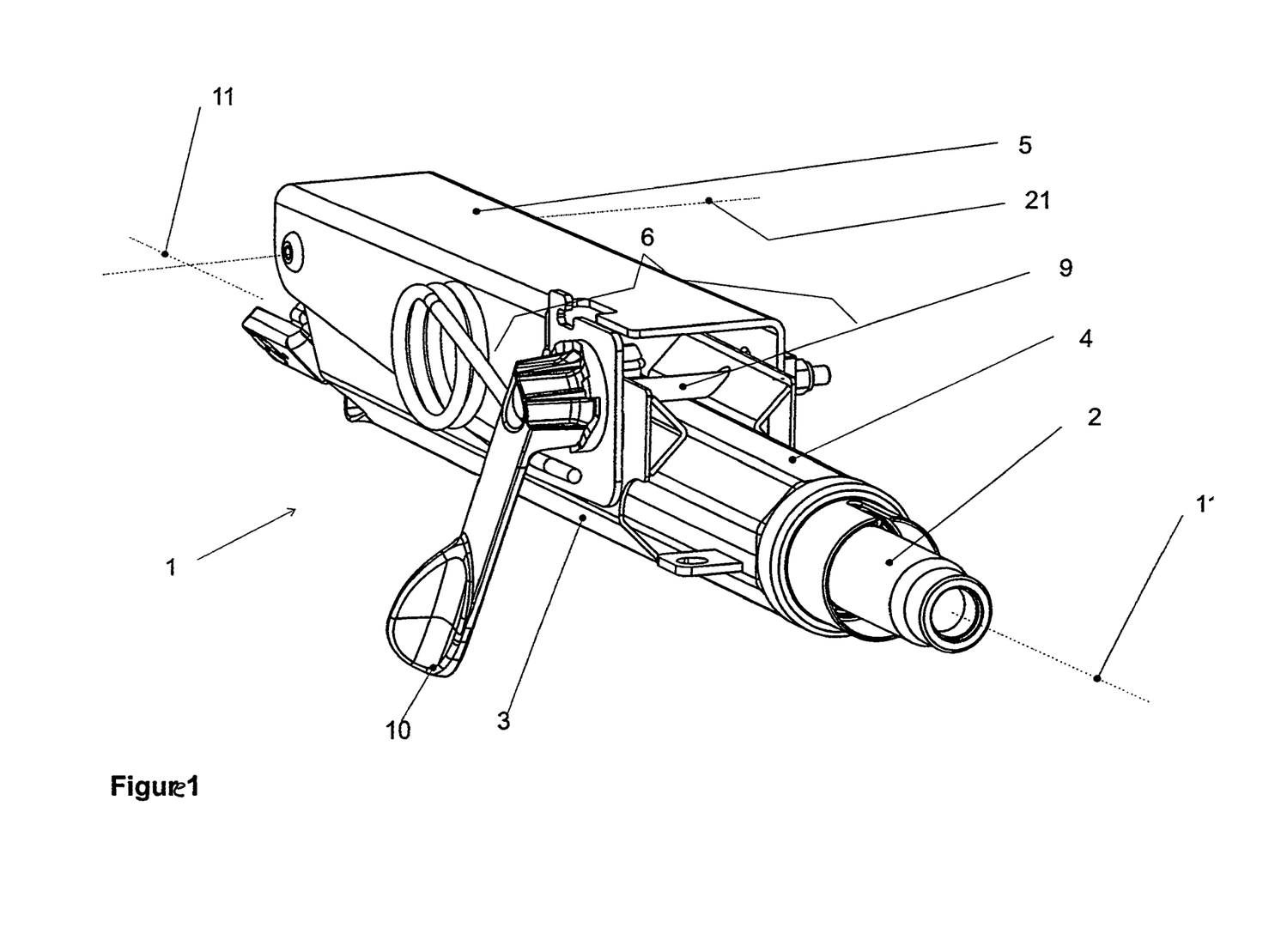
FIG. 1 shows an embodiment of the steering column in accordance with the invention.
Figure 2:
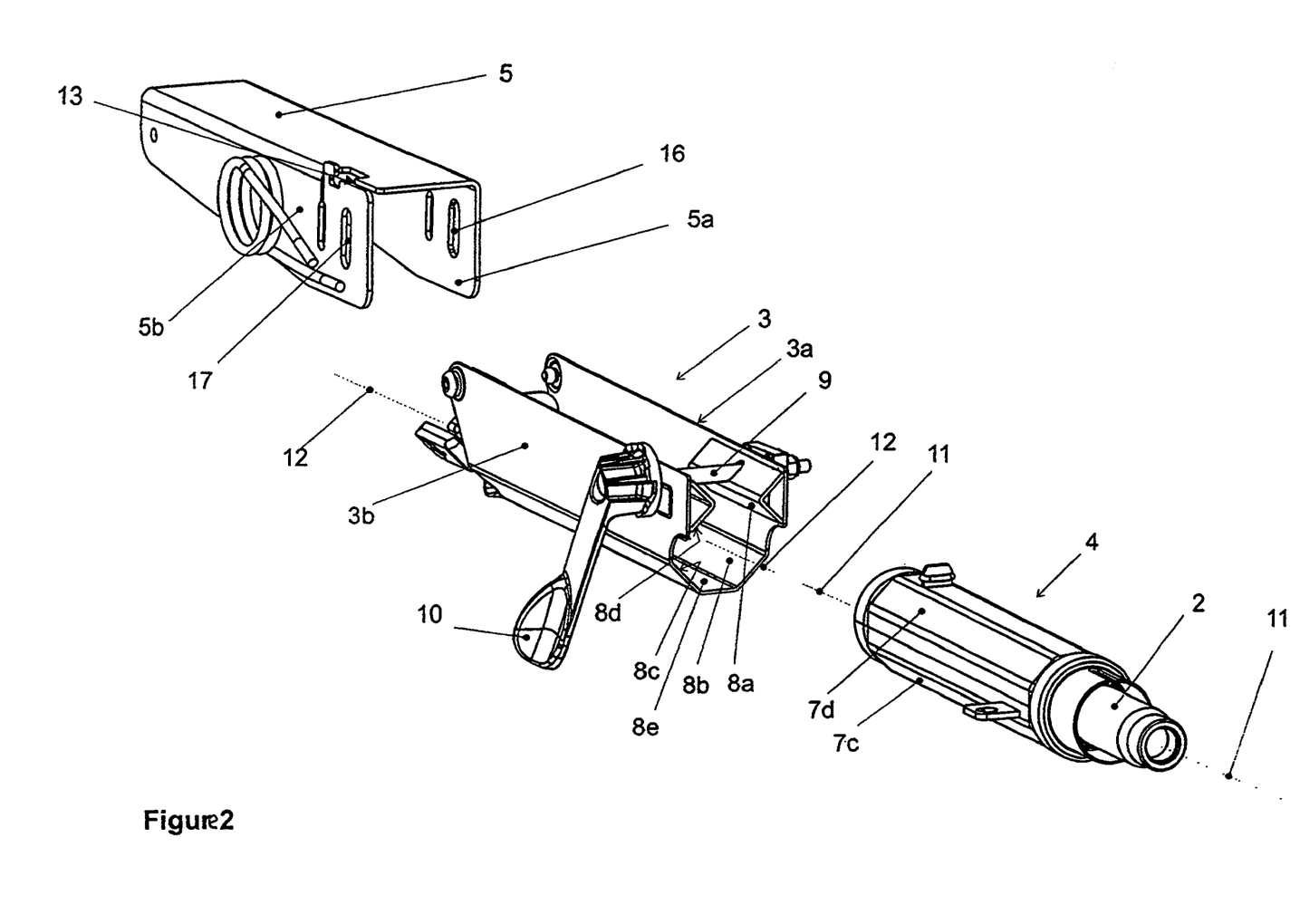
FIG. 2 shows an embodiment of the steering column in accordance with the invention with an exploded illustration of the individual parts.

The manufacturing tolerances of the adjusting part and holding part can be compensated in a convenient manner during assembly, in that the inserted corners which support the surface portions 8a and 8d (FIG. 3) are pressed during the pre-assembly with a predetermined adjustment of the fixing device with a predetermined amount of force onto the allocated surface portions 7a or 7d and then connected to the part of the holding part which supports the other surface portions 8c, 8e, 8b. The connection is then made in the most convenient case using welding technology. The holding part 3 is thus composed of three individual parts and can be easily installed in the steering column with the adjusting part 4 as an assembly, as is illustrated in FIG. 2.

Figure 5:
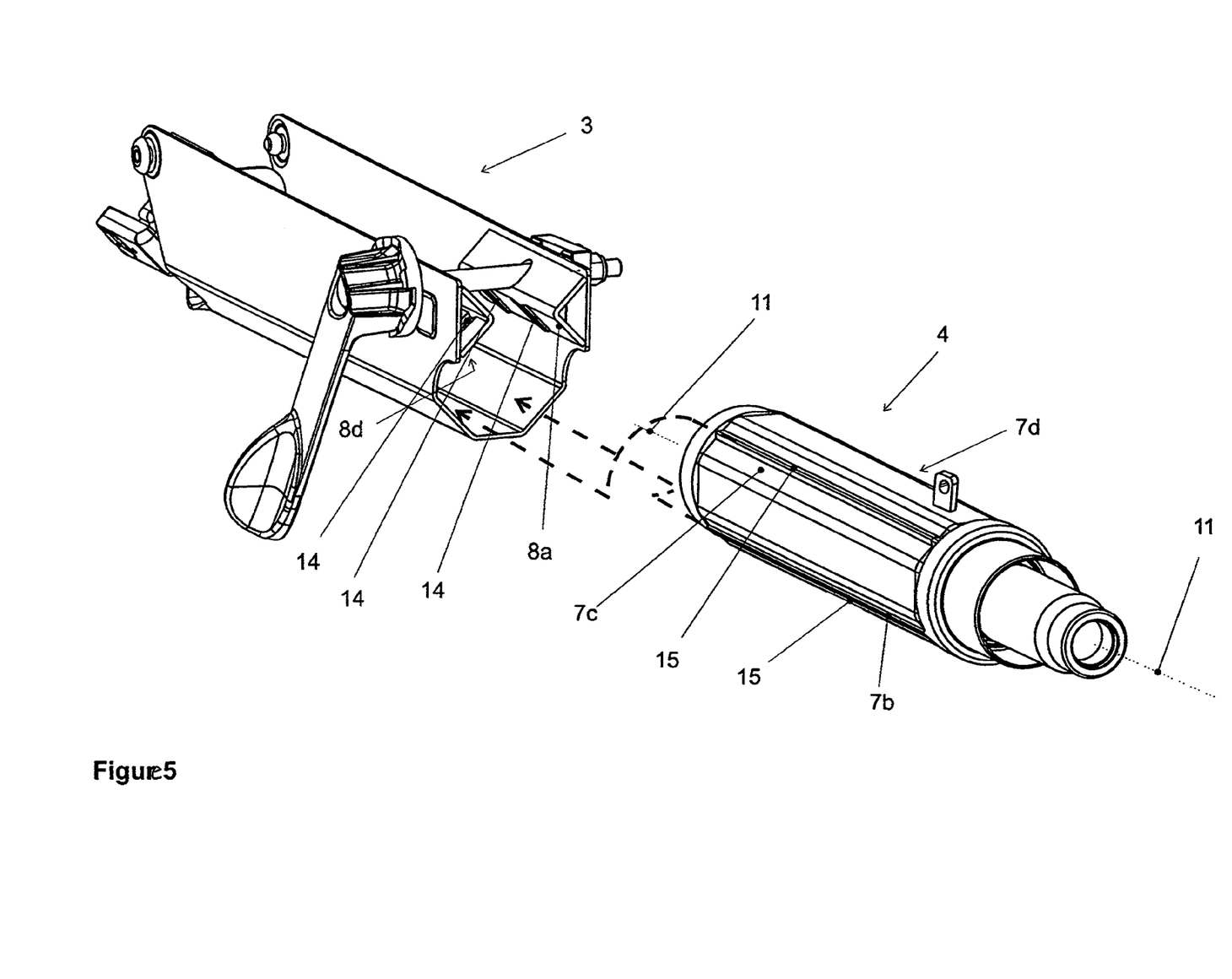
FIG. 5 shows an alternative embodiment of the holding part and the adjusting part.

FIG. 5 illustrates an alternative embodiment of the steering column where strip-like elevations are formed on some of the surface portions. In the example strip-like elevations 15 are formed on the surface portions 7b and 7c of the adjusting part 4 and extend along the axis 11 of the steering shaft 2. By way of clarification, the adjusting part 4 in FIG. 5 has been illustrated rotated with respect to the illustration in FIG. 2 about the axis 11 of the steering shaft 2.

Two parallel strip-like elevations 14 are formed in the holding part 3 on the surface portions 8a and 8d respectively. These, are however, aligned perpendicular with respect to the axis 11 of the steering shaft 2.

For assembly purposes, the adjusting part 4 is positioned in the holding part 3 according to the rotation and displacement illustrated by the broken arrow lines, so that in each case a strip-like elevation cooperates with a surface portion which is substantially planar.

Figure 6:
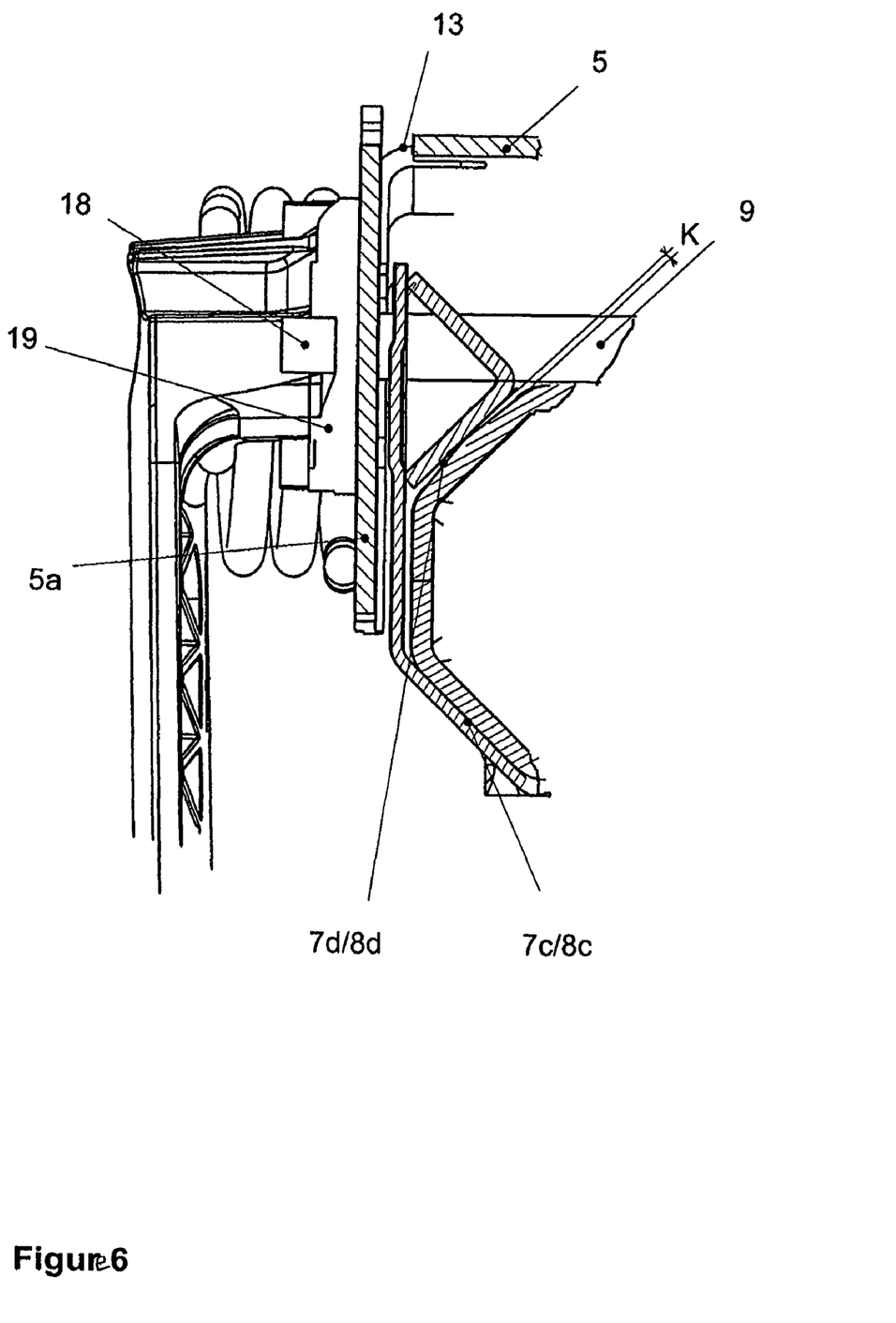
FIG. 6 shows a partial sectional view through the fixing device in an alternative embodiment in the open state.

In a further embodiment, surface portions can be convex. One example of this is illustrated considerably exaggerated in FIG. 6. The corresponding surface portion is formed with a convexity K which is elastically pressed in as the fixing device is closed.

It is obvious that any combinations of strip-like elevations along and/or transverse to the axis 11 of the steering shaft, planar surface portions, crowned or arched surface portions are possible and each can be used depending upon the application.

The holding part 3 is advantageously pushed over the adjusting part 4 with a pretension in the direction of the steering shaft 2. As a consequence, even when the fixing device 6 is open, an effective guide of the adjusting part 4 is ensured.

It is further advantageous to connect the holding clamp 5 firmly and also in the event of a crash in a non-displaceable manner to the vehicle, wherein the entire energy is absorbed in a crash by means of the displacement of the adjusting part 4 with respect to the holding part 3.

The figures illustrate only examples of a steering column in accordance with the invention, where the tensioning pin 9 is disposed about the steering shaft 2. This arrangement offers the advantage of a smaller installation height. It can, however be expedient for specific vehicles, for example for reasons of packaging, to dispose the tensioning pin below the steering shaft. The teaching of the invention can also be used for such designs.

It is obvious that all embodiments of the solution in accordance with the invention can be combined with the known types of fixing devices to adjust the height and/or the inclination. Thus, systems with blades or toothing arrangements can also be used to fix the position. Likewise, it is also possible to use for example systems with roller bodies or shaft elements in place of the cams and connecting link disc to apply the tension.

LIST OF DESIGNATIONS

1 Steering column
2 Steering shaft
3 Holding part
3a Side surface
3b Side surface
4 Adjusting part
5 Holding clamp
5a Side cheek
5b Side cheek
6 Fixing device
7a First surface portion
7b First surface portion
7c First surface portion
7d First surface portion
7e First surface portion
8a Second surface portion
8b Second surface portion
8c Second surface portion
8d Second surface portion
8e Second surface portion
9 Tensioning pin
10 Adjusting lever
11 Axis of steering shaft
12 Longitudinal axis of holding part
13 Slot
14 Strip-like elevation
15 Strip-like elevation
16 Oblong hole
17 Oblong hole
18 Cam
19 Connecting link disc
20 Counter holder
21 Pivot axis
K Convexity

The invention claimed is:

1. Adjustable steering column for a motor vehicle, comprising:
   a) a steering shaft which is mounted in such a manner as to be able to rotate about its axis in an adjusting part,
   b) a holding clamp attached to the vehicle for holding the steering column,
   c) a holding part, and
   d) a fixing device and when the fixing device is in the open state the adjusting part can be adjusted with respect to the holding part at least in the axial direction of the steering shaft to adjust the position of the steering column and when the fixing device is in the closed state the adjusting part is fixed with respect to the holding part by the fixing device,
   e) wherein a surface of the adjusting part, directed away from the steering shaft, comprises in the peripheral direction a plurality of first planar surface portions,
   f) and a surface of the holding part, which at least partially surrounds the adjusting part and is directed towards the steering shaft, comprises second planar surface portions,
   g) wherein the first and second surface portions extend in the direction of the axis of the steering shaft and wherein at least three pairs of first and second planar surface portions can be brought at least partially into non-positive or non-positive and positive contact for fixing the adjusting part, h) wherein the holding clamp comprises side cheeks which can be drawn together by closing the fixing device and as a consequence the holding part can be clamped, and i) wherein the holding clamp is formed as a one-piece component with a pivot axis disposed on a first end and the fixing device is disposed on an opposite end in the direction of the axis of the steering shaft, and with the side cheeks of the holding clamp extending from the pivot axis to a location where the fixing device is disposed; wherein said holding part is generally U-shaped and comprises an orifice extending the length of said holding part.

2. The steering column as claimed in claim 1, wherein the pivot axis penetrates the side cheeks.

3. The steering column as claimed in claim 1, wherein the side cheeks are provided with oblong holes which are disposed in a spaced disposition from the pivot axis as seen in the longitudinal direction of the steering column.

4. The steering column as claimed in claim 3, wherein the pivot axis is disposed on the first end and the oblong holes are disposed on the opposite end of the holding clamp.

5. The steering column as claimed in claim 1, wherein at least one of the first and/or second surface portions comprises at least one strip-like elevation to form discrete pressure points.

6. The steering column as claimed in claim 5, wherein at least one strip-like elevation is aligned in the direction of the axis of the steering shaft.

7. The steering column as claimed in claim 5, wherein at least one strip-like elevation is aligned perpendicular to the axis of the steering shaft.

8. The steering column as claimed in claim 1, wherein at least one of the surface portions is crowned, so that it comprises a convexity.

9. The steering column as claimed in claim 1, wherein the highest point of the convexity protrudes beyond an imaginary planar surface portion reference by a maximum of 0.05 mm.

10. The steering column as claimed in claim 1 wherein the orifice of the holding part along its longitudinal axis can be reduced in size when closing the fixing device, so that the surface portions can be brought into mutual contact by means of a surface pressing force which is necessary to fix the adjusting part.

11. The steering column as claimed in claim 10, wherein the holding part is penetrated by a tensioning pin which moves in its axial direction as the fixing device is being opened and closed and as a consequence the orifice in the holding part is increased or reduced in size.

12. The steering column as claimed in claim 1, wherein 4 pairs of first and second surface portions can be brought at least partially into contact.

13. The steering column as claimed in claim 1, wherein the holding clamp comprises a U-shaped cross-section.

14. The steering column as claimed in claim 1, wherein when the fixing device is in the open state the holding part can be adjusted with respect to the holding clamp and when the fixing device is in the closed state the holding part is fixed.

15. The steering column as claimed in claim 1, wherein the holding clamp is penetrated by a tensioning pin.

* * * * *